United States Patent
Weng et al.

(10) Patent No.: US 8,693,739 B2
(45) Date of Patent: Apr. 8, 2014

(54) SYSTEMS AND METHODS FOR PERFORMING FACIAL DETECTION

(75) Inventors: Chung-Yi Weng, Taichung (TW); Shih-Min Tang, Tainan County (TW); Ho Chao Huang, New Taipei (TW)

(73) Assignee: Cyberlink Corp., Shindian (TW)

( * ) Notice: Subject to any disclaimer, the term of this patent is extended or adjusted under 35 U.S.C. 154(b) by 357 days.

(21) Appl. No.: 13/216,532

(22) Filed: Aug. 24, 2011

(65) Prior Publication Data
US 2013/0051678 A1 Feb. 28, 2013

(51) Int. Cl.
*G06K 9/62* (2006.01)
(52) U.S. Cl.
USPC .......................................................... 382/118
(58) Field of Classification Search
None
See application file for complete search history.

(56) References Cited

U.S. PATENT DOCUMENTS

| | | | | |
|---|---|---|---|---|
| 7,864,989 B2 * | 1/2011 | Song et al. | | 382/116 |
| 8,326,000 B2 * | 12/2012 | Jung et al. | | 382/118 |
| 2006/0008145 A1 * | 1/2006 | Kaku | | 382/173 |

* cited by examiner

*Primary Examiner* — Brian P Werner
(74) *Attorney, Agent, or Firm* — McClure, Qualey & Rodack, LLP

(57) ABSTRACT

Various embodiments are disclosed for detecting facial regions in a plurality of images. In one embodiment, a method comprises assigning at least one of the possible facial regions an assurance factor, forming clusters of possible facial regions based on a connection factor between the facial regions, and determining facial regions from the possible facial regions based on the assurance factor and the clusters of possible facial regions.

21 Claims, 13 Drawing Sheets

SYSTEMS AND METHODS FOR PERFORMING FACIAL DETECTION

TECHNICAL FIELD

The present disclosure generally relates to processing of digital images and in particular, performing facial detection.

BACKGROUND

With the widespread use of digital cameras, many individuals turn to image management tools to archive and organize their digital photographs. Image management tools found on the market offer various features, including the automatic detection of human faces. This feature is useful in helping to identify the presence of individuals within a collection of images. However, in many cases, objects may be inaccurately identified as individuals. While manually organizing photos is an alternative, this approach can be tedious and time-consuming and dealing with a large volume of images.

SUMMARY

Briefly described, one embodiment, among others, is a method for detecting facial regions in a plurality of images. The method comprises detecting possible facial regions in the plurality of images, assigning at least one of the possible facial regions an assurance factor, computing at least one connection factor between at least one possible facial region and at least one of the remaining possible facial regions in the plurality of images, and determining facial regions from the possible facial regions based on the assurance factors and connection factors.

Another embodiment is an image processing system that comprises an assurance factor generator configured to detect possible facial regions in a plurality of images and assign at least one of the possible facial regions an assurance factor based on facial characteristics in the detected possible facial regions, a connection factor generator configured to assign, for at least one of the possible facial regions, a value reflecting a connection factor between a current possible facial region and all remaining possible facial regions, and a facial region determiner configured to determine one or more facial regions based on the assurance factor and connection factor.

Another embodiment is a method for detecting facial regions among possible facial regions in a plurality of images that comprises assigning at least one of the possible facial regions an assurance factor, forming clusters of possible facial regions based on a connection factor between the facial regions, and determining facial regions from the possible facial regions based on the assurance factor and the clusters of possible facial regions.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
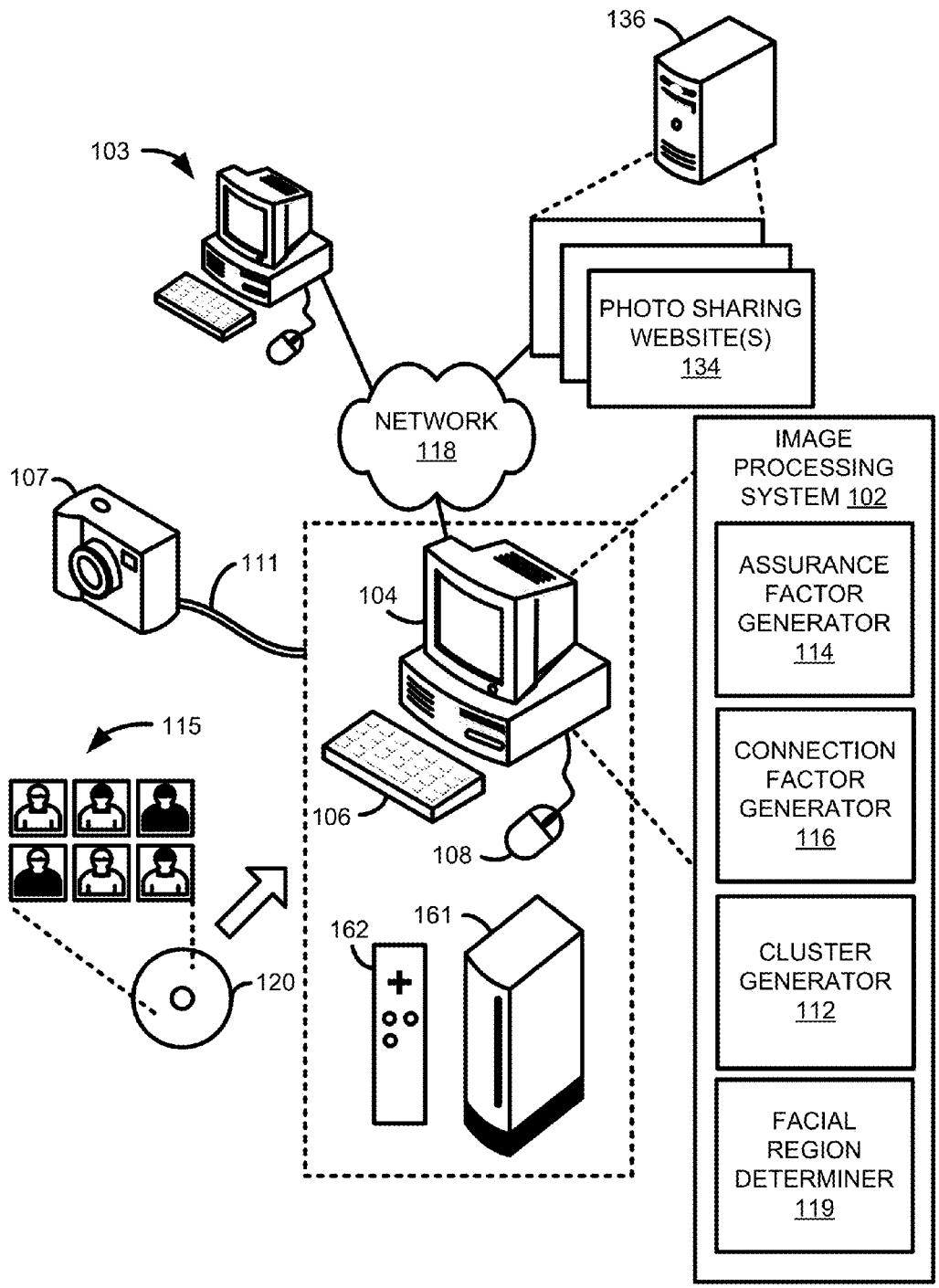
FIG. 1 depicts a top-level diagram of an image processing system for performing facial detection.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

When detecting faces in images, false hits may occur due to the presence of objects with characteristics similar to those of human faces. For example, a wheel or some other round object may be inaccurately identified as a facial region. When processing an actual face of an individual as a baseline, it is generally easier to locate faces with similar attributes. On the other hand, when relying on an inaccurately identified facial region as a baseline, it becomes less likely to identify other faces with similar attributes. Embodiments are disclosed for an improved facial recognition technique, whereby a multi-tiered approach is implemented. The systems and methods disclosed provide a reliable means for performing facial detection and reduce false hits in a collection of images.

In a first embodiment, a facial recognition operation is performed to identify faces of individuals. After the facial recognition phase, each identified facial region is assigned an assurance factor. More details regarding the assignment of assurance factors are described later. For some embodiments, the identified facial regions undergo a second tier evaluation, whereby a connection factor is computed between each pair of faces. Based on the assurance factors and connection factors, facial regions are discarded in the sense that they are no longer used for facial matching or other processing involving human faces (e.g., clustering). In some cases, the images may be deleted from the system altogether, and in other cases, the images may simply be ignored or bypassed.

In some embodiments, detected faces are discarded if a corresponding assurance factor is below a first threshold. Similarly, detected faces are discarded if a corresponding connection factor is below a second threshold. A high degree of confidence is achieved that the faces which remain after the multi-tiered processing are actually faces of individuals. As will be described later, other embodiments may incorporate clustering to help identify and filter falsely identified faces.

A description of a system for performing facial detection is now described followed by a discussion of the operation of the components within the system. FIG. 1 is a block diagram of an environment in which embodiments of an image processing system 102 may be implemented. The image processing system 102 may be embodied, for example, as a desktop computer, computer workstation, laptop, or other computing platform. In other embodiments, the image processing system 102 may be embodied as a video gaming console 161, which includes a video game controller 162 for receiving user preferences. For such embodiments, the video gaming console 161 may be connected to a television (not shown) or other display.

The image processing system 102 includes a display 104 and input devices such as a keyboard 106 and a mouse 108. The image processing system 102 comprises an assurance factor generator 114, a connector factor generator 116, and a facial region determiner 119. In accordance with some embodiments, the image processing system further comprises a cluster generator 112. The assurance factor generator 114 is configured to detect facial regions in a plurality of images 115 and assign each of the facial regions an assurance factor based on facial characteristics in the detected facial regions. The connection factor generator 116 is configured to assign, for each facial region, a value reflecting a connection factor between a current image and all the remaining images. Thus, each identified facial region has a connection factor assigned for all other identified facial regions. For some embodiments, assigning a value reflecting a connection factor is performed by determining similarities in facial characteristics between the current possible facial region with respect to each of the remaining possible facial regions, and assigning a value quantifying the degree of similarities in facial characteristics according to a predetermined scale.

The image processing system 102 further comprises a facial region determiner 119 configured to discard images based on a corresponding assurance factor and connection factor. The cluster generator 112 is configured to cluster facial regions based on the connection factors such that facial regions with a relatively high degree of connectivity are clustered together. For some embodiments, the facial region determiner 119 discards facial regions that are not clustered with any other facial regions.

The image processing system 102 is configured to receive digital images 115 stored on a storage medium such as by way of example and without limitation, a compact disc (CD) 120 or a universal serial bus (USB) flash drive. As one of ordinary skill will appreciate, the digital images 115 may be encoded in any number of formats, including but not limited to, JPEG (Joint Photographic Experts Group) files, TIFF (Tagged Image File Format) files, PNG (Portable Network Graphics) files, GIF (Graphics Interchange Format) files, and BMP (bitmap) files. As depicted in FIG. 1, the image processing system 102 may also receive digital images 115 directly from a digital camera 107 via a cable 111 or some other interface. The image processing system 102 may support any one of a number of common computer interfaces, such as, but not limited to IEEE-1394 High Performance Serial Bus (Firewire), USB, a serial connection, and a parallel connection.

The digital camera 107 may also be coupled to the image processing system 102 over a wireless connection or other communication path. The image processing system 102 may be coupled to a network 118, such as the Internet or a local area network (LAN). Through the network 118, the image processing system 102 may receive digital images 115 from another computing system 103. Alternatively, the image processing system 102 may access one or more photo sharing services 134 (e.g., Picassa from Google, Flickr®) hosted on a server 136 via the network 118 to retrieve digital images 115.

Figure 2:
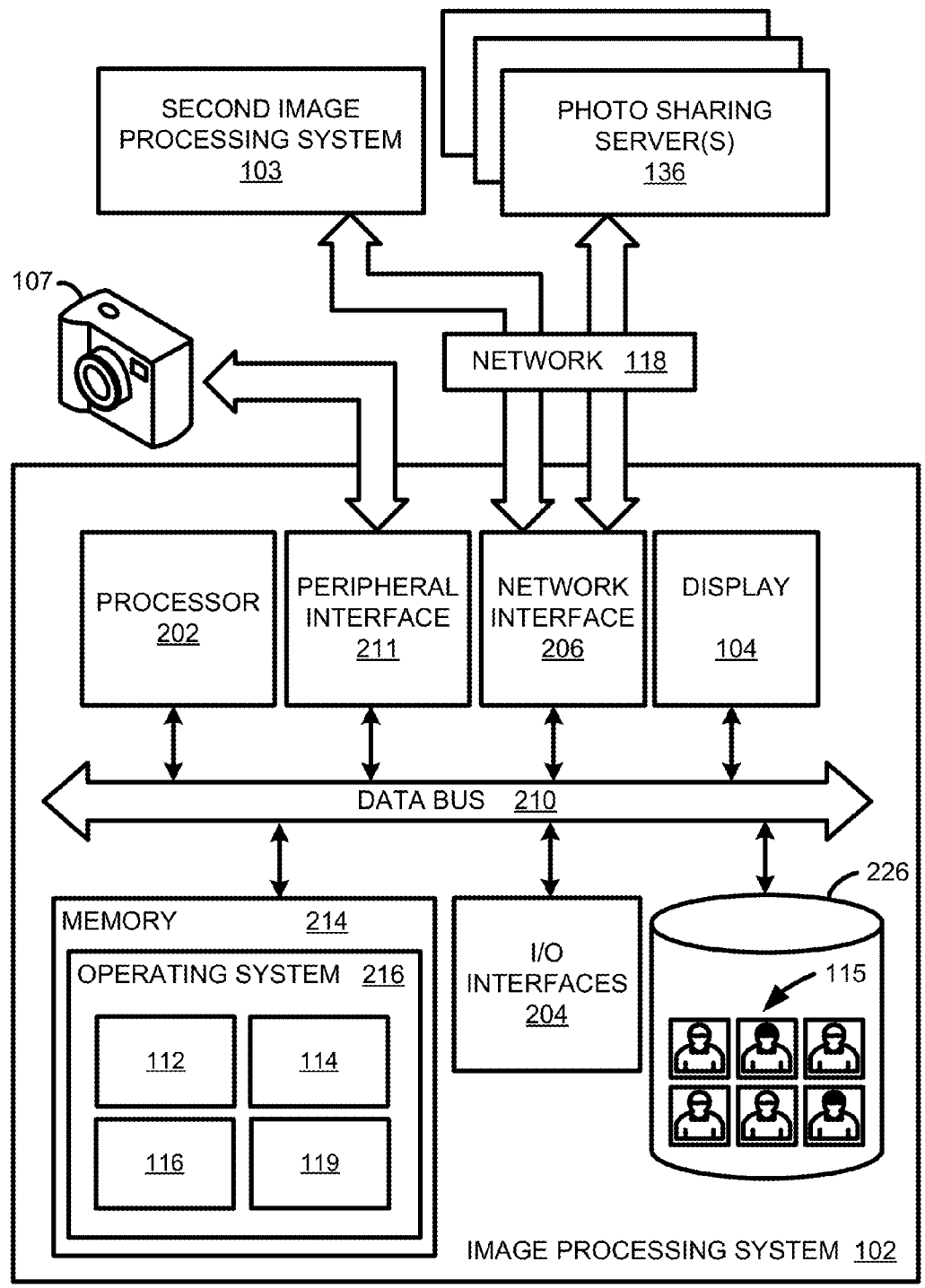
FIG. 2 illustrates additional components of the image processing system shown in FIG. 1.

FIG. 2 illustrates an embodiment of the image processing system 102 shown in FIG. 1. The image processing system 102 may be embodied in any one of a wide variety of wired and/or wireless computing devices, such as a desktop computer, portable computer, dedicated server computer, multi-processor computing device, smartphone, personal digital assistant (PDA), digital camera, and so forth. As shown in FIG. 2, the image processing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the image processing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components 112, 114, 116, 119 of the image processing system 102 depicted in FIG. 1. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the image processing system 102 comprises a personal computer, these components may interface with one or more user input devices 204, which may comprise a keyboard or a mouse, as shown in FIG. 2. The display 104 may comprise a computer monitor, a plasma screen for a PC, a liquid crystal display (LCD) on a hand held device, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
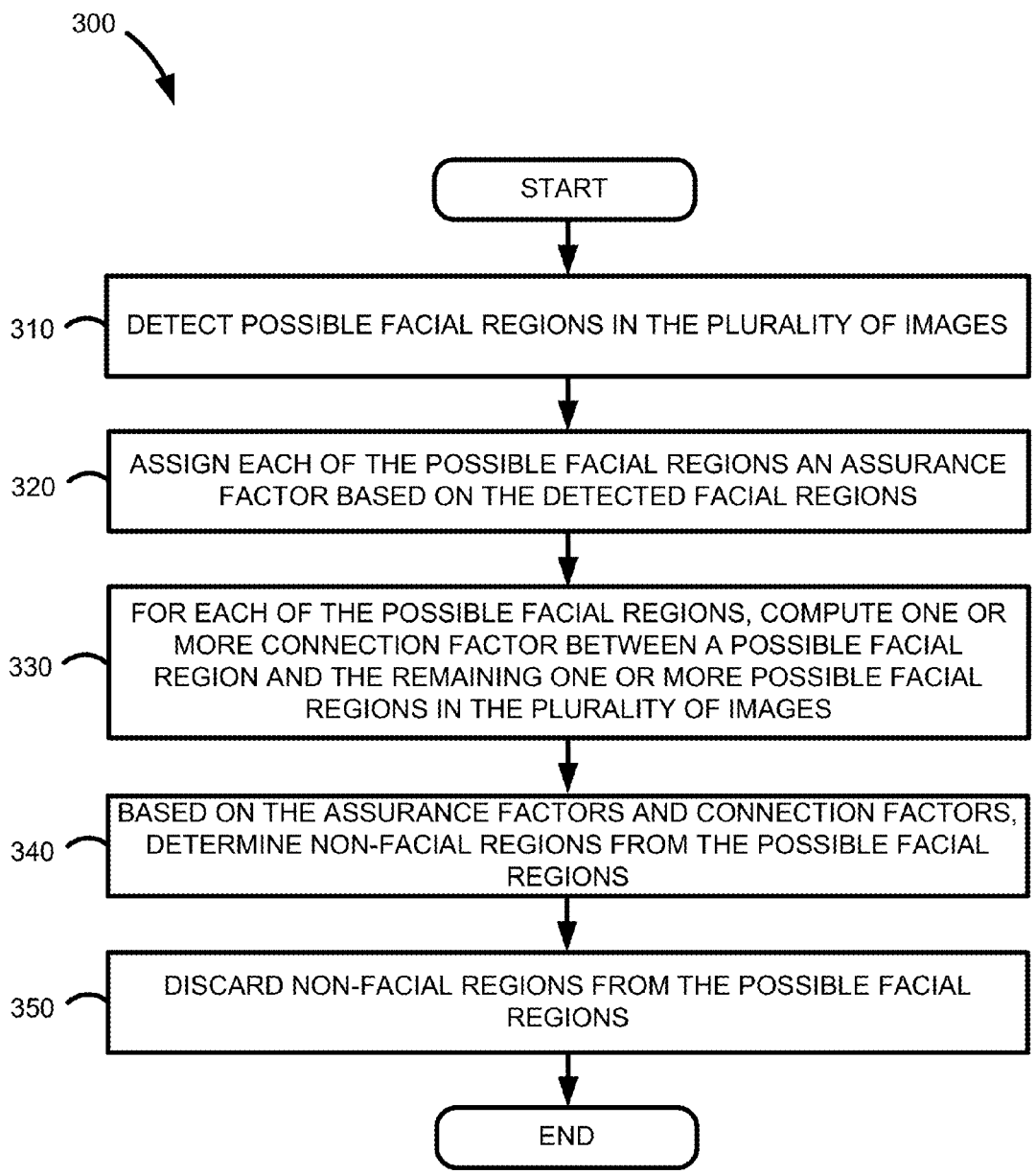
FIG. 3 is a flowchart for a method of performing facial detection utilizing the image processing system of FIGS. 1 and 2.

Reference is now made to FIG. 3, which is a flowchart 300 for a method of performing facial detection utilizing the image processing system 102 of FIGS. 1 and 2. If embodied in software, each block depicted in FIG. 3 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor in a computer system or other system such as the one shown in FIG. 1. The machine code may be converted from the source code, etc. If embodied in hardware, each block may represent a circuit or a number of interconnected circuits to implement the specified logical function(s).

Although the flowchart 300 of FIG. 3 shows a specific order of execution, it is understood that the order of execution may differ from that which is depicted. In accordance with some embodiments, a method for detecting facial regions in a plurality of images 115 is disclosed. As discussed in connection with FIG. 1, the images 115 may be received by the image processing system 102 from various sources including, for example, a storage medium such as a CD 120 or from a digital camera 107. The method comprises detecting possible facial regions in the plurality of images (block 310). In block 320, each of the possible facial regions is assigned an assurance factor based on the detected facial regions. For each of the possible facial regions, one or more connection factors are computed between a possible facial region and the remaining one or more possible facial regions in the plurality of images (block 330). Based on the assurance factors and connection factors, non-facial regions are determined from the possible facial regions (block 340). In block 350, non-facial regions are discarded from the possible facial regions.

Figure 4A:
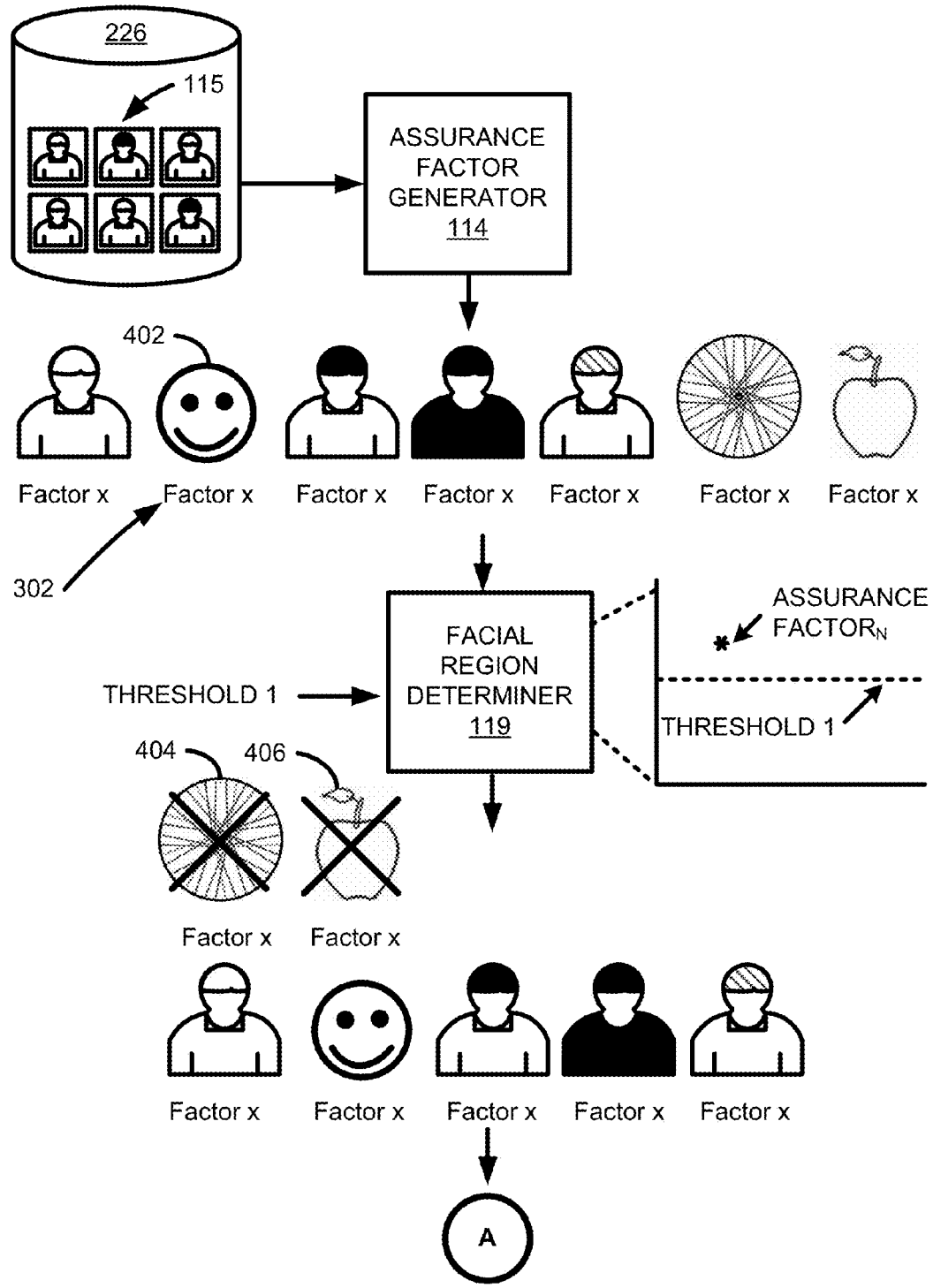
FIGS. 4A-4C illustrate the process flow among the components shown in the image processing system of FIG. 1.
Figure 4B:
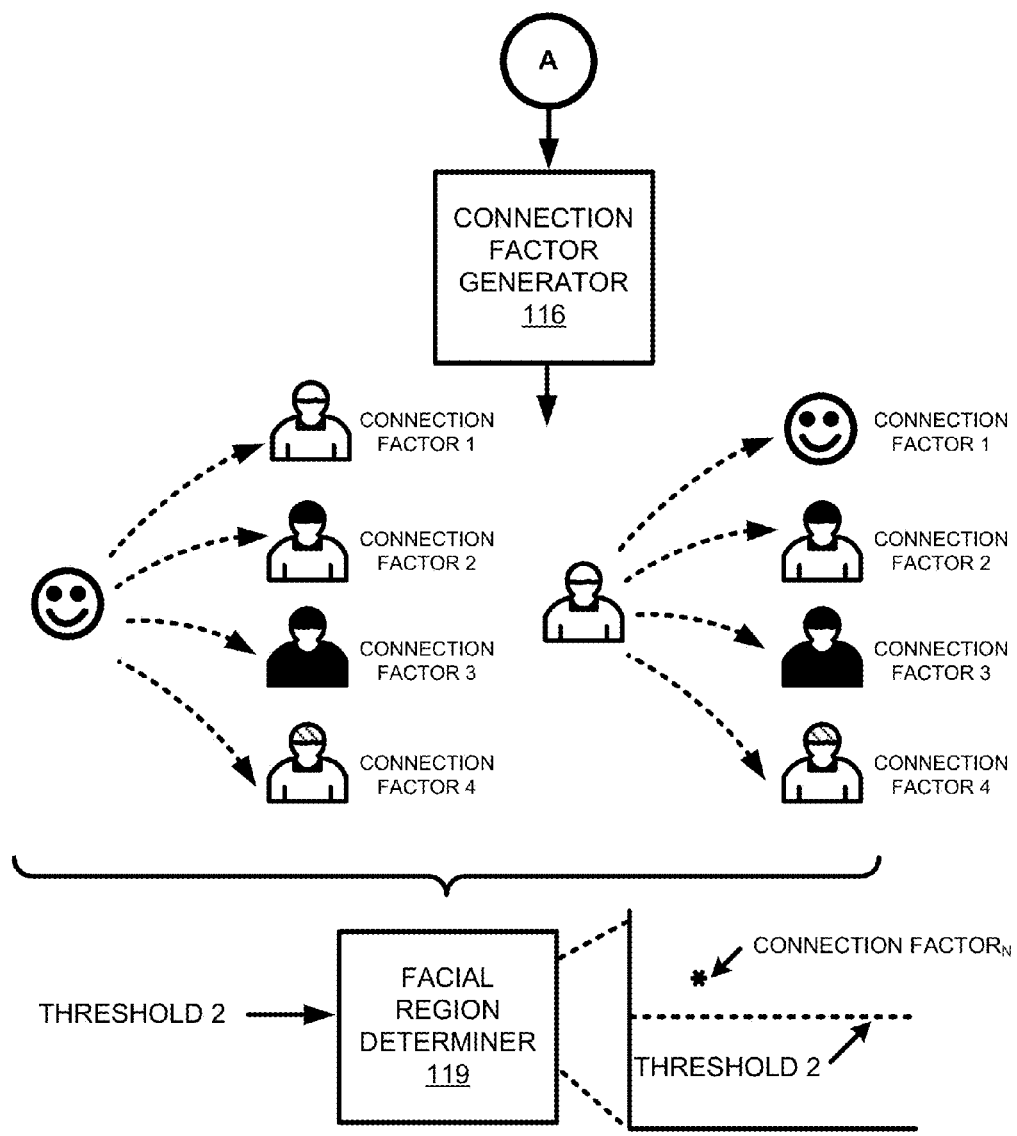
Figure 4C:
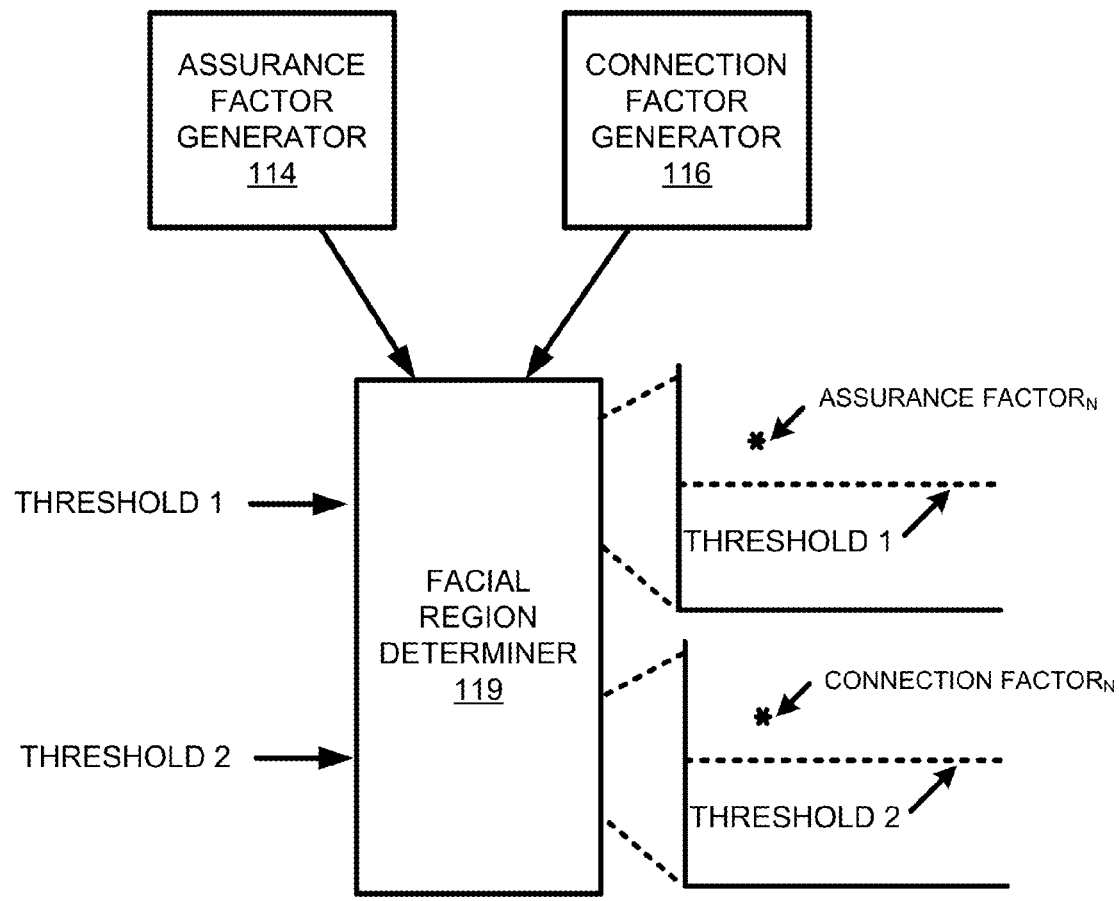

FIGS. 4A-4C illustrate the process flow among the components shown in the image processing system 102 of FIG. 1. As described, digital images 115 are received by the image processing system 102. In some implementations, the digital images 115 are first stored in the storage device 226 for processing. The assurance factor generator 114 reads the images 115 and performs facial detection on each image 115, where some images may contain multiple individuals. For purposes of illustration, the collection of images 115 shown in FIG. 4A also include various objects that conventional systems may inaccurately identify as human faces. As shown, these images 115 include a cartoon face 402, a wheel 404, and an apple 406.

Due to the round shape and in some cases facial characteristics (e.g., eyes), these objects 402, 404, 406 may be inaccurately identified as human faces. Based on the detected facial regions, the assurance factor generator 114 assigns each of the images 115 an assurance factor 302. While all the images 115 shown have an assurance factor "Factor x," it should be appreciated that each of the images can and will generally have different assurance factor values. For some embodiments, the assurance factor generator 114 assigns assurance factors based on the presence of a predetermined number of facial characteristics. For example, the assurance factor generator 114 may be configured to search for the presence of a nose, eyes, hair, a mouth, among other facial characteristics. Other facial characteristics may include by way of example and without limitation, the distance from the eyes to the nose, the distance from the eyes to the mouth, hair style, and hair color.

Figure 8A:
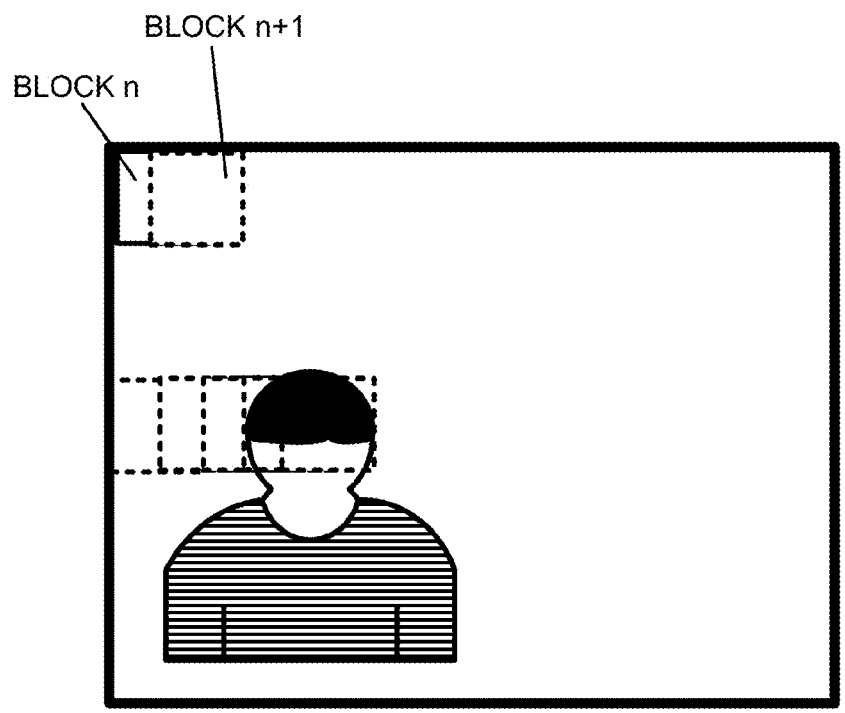
FIGS. 8A-B illustrate a multi-scan approach for assigning assurance factors.
Figure 8B:
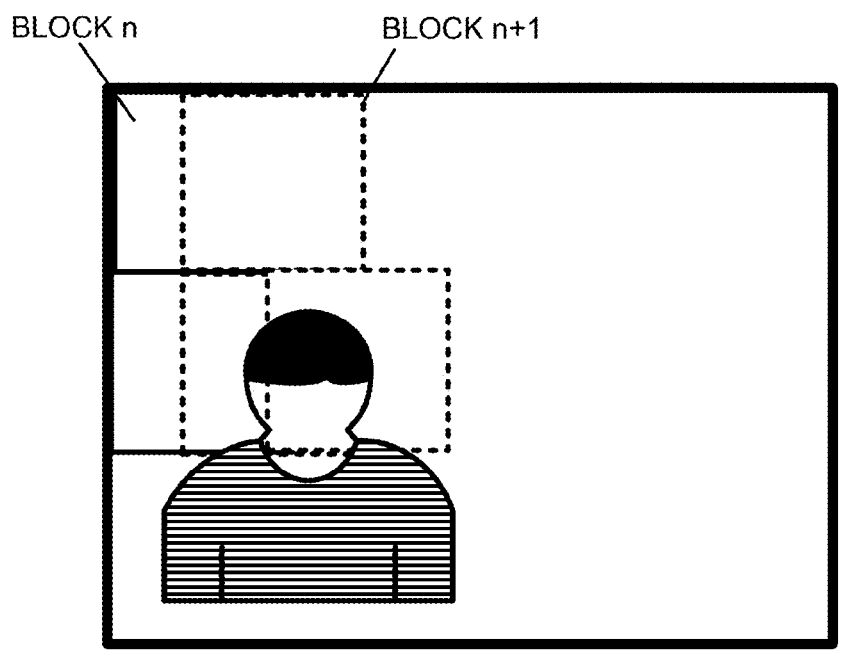

In accordance with some embodiments, the assurance factor generator 114 assigns an assurance factor by first scanning a target image and dividing the scanned target image into small blocks and then using successively larger blocks. Blocks of variable sizes are used as the size of each face in an image is unknown. Thus, scanning a large facial region using smaller blocks might result in the facial region not being detected. Thus, a multi-scan approach is used whereby variable-sized block are used in order to increase accuracy in detecting facial regions. Reference is made to FIGS. 8A-B, which illustrate a multi-scan approach using successively bigger blocks. First, a scan of the image is performed using a small block of a predetermined size (FIG. 8A). A scan of the entire image is performed using the blocks, where the blocks are offset by a single pixel/ratio such that the blocks overlap. Upon scanning the entire image, a certain number of blocks (e.g., 50 blocks) are determined to contain part of a facial region.

Figure 9A:
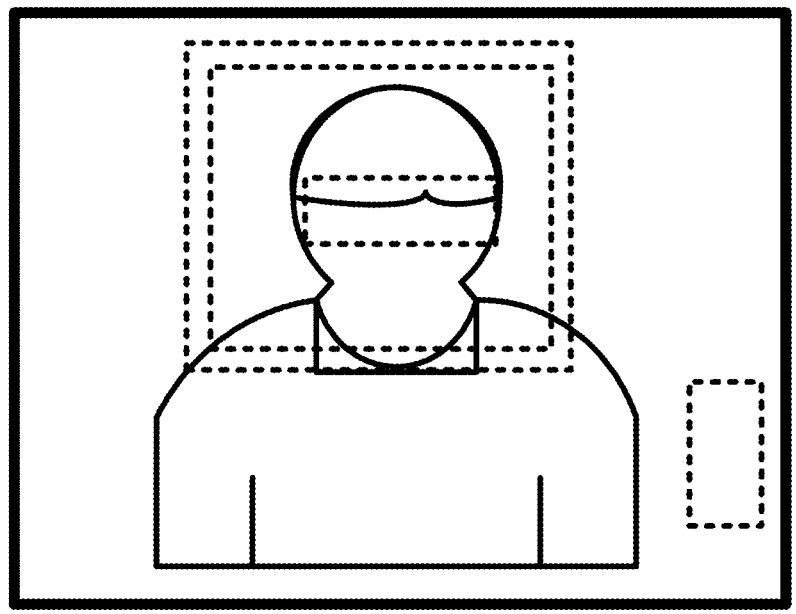
FIGS. 9A-E illustrate an embodiment for classifying blocks to assign an assurance factor.
Figure 9B:
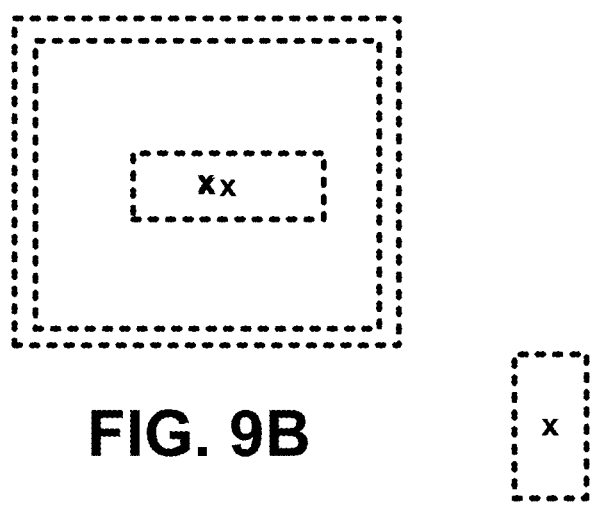
Figure 9C:
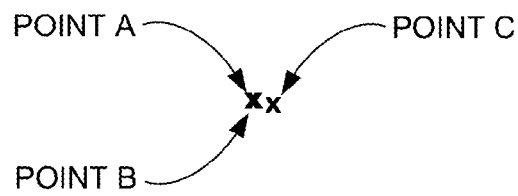
Figure 9C:

Next, the same process is performed with a larger block (FIG. 8B). Again, the entire image is scanned using the blocks, where the blocks are offset by a single pixel/ratio such that the blocks overlap. To further illustrate, reference is made to FIGS. 9A-D. Upon scanning the entire image, a certain number of blocks (e.g., 4 blocks) are determined to contain at least a portion of a possible facial region. As shown in FIG. 9A, the blocks may be of different sizes, and some blocks may overlap. As shown in FIG. 9B, the center point of each block is identified, as designated by the "x" symbols. In accordance with some embodiments, the center points of blocks that fall within a predetermined distance threshold are classified. For example, the respective distances between points A and B, points A and C, and points B and C are determined.

If a given distance between two points falls within a predetermined distance threshold, then the associated blocks are classified and the corresponding points are grouped together. In the example shown in FIG. 9C, assume for purposes of illustration that point D exceeds the predetermined distance threshold. Point D is therefore not grouped together with points A, B, and C. Note, however, that point D may be classified with other points as the distance between point D and the other points may fall within the predetermined distance threshold, where the other points, for example, are associated with other blocks relating to a second facial region (not shown).

Figure 9D:
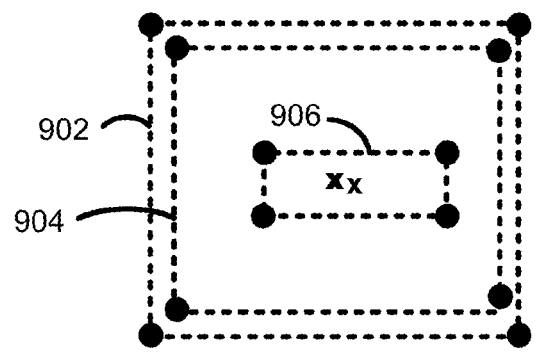
Figure 9E:
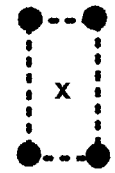
Figure 9E:
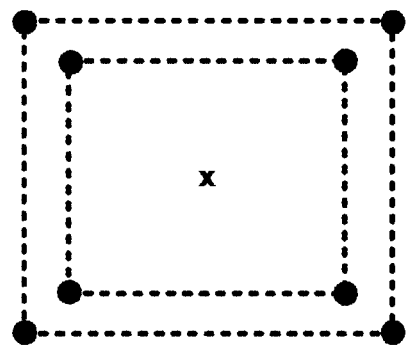

Next, as depicted in FIG. 9D, the four corners of each block are determined. The center points of blocks that fall within the predetermined distance threshold are classified. In the example shown in FIG. 9D, the block 906 corresponding to point C is not grouped together with the blocks 902, 904 corresponding to points A and B as the distance between the third block 906 and the other blocks 902, 904 with respect to the four corners does not fall within a predetermined distance. This may occur, for example, if the third block 906 falls in a shadow or black area within a facial region. Thus, various embodiments utilize the four-corner technique described above to increase the accuracy of detecting facial regions. As illustrated in FIG. 9E, there may be scenarios where blocks share a common center point, although the blocks are of different sizes. Blocks that exceed the predetermined distance threshold are not grouped together. For those blocks that are grouped together, assurance factors are assigned based on the number of blocks recognized as containing at least a portion of a facial region.

In accordance with some embodiments, the facial region determiner 119 filters out images with assurance factors below a first predetermined threshold. In the non-limiting example shown, the wheel 404 and the apple 406 are discarded due to relatively low assurance factors. The relatively low assurance factors may be attributed to, for example, the absence of a mouth, eyes, and other facial features. The remaining images are then processed by the connection factor generator 116, which determines a connection factor between a current image and all the other images. As shown in FIG.

4B, a first image will have a connection factor computed with respect to each of the other images. As with the assurance factors, the connection factors for each image may be stored in an array or other data storage structure within the mass storage device 226 shown in FIG. 2. Based on the assigned connection factors, the facial region determiner 119 filters images that have a connection factor below a second predetermined threshold.

It should be emphasized that for alternative embodiments, filtering is not performed until the end. Reference is made to FIG. 4C. In accordance with some embodiments, all the images 115 are forwarded to the connection factor generator 116 after assurance factors are assigned. As shown, the facial region determiner 119 filters or discards images 115 only after both assurance factors and connection factors have been assigned. For some embodiments, an image is filtered if both the assurance factor is below a first predetermined threshold and if the connection factor is below a second predetermined threshold. That is, an image is filtered only if both conditions are met. However, as described above, an image may also be filtered if at least one of the conditions is met.

Figure 5A:
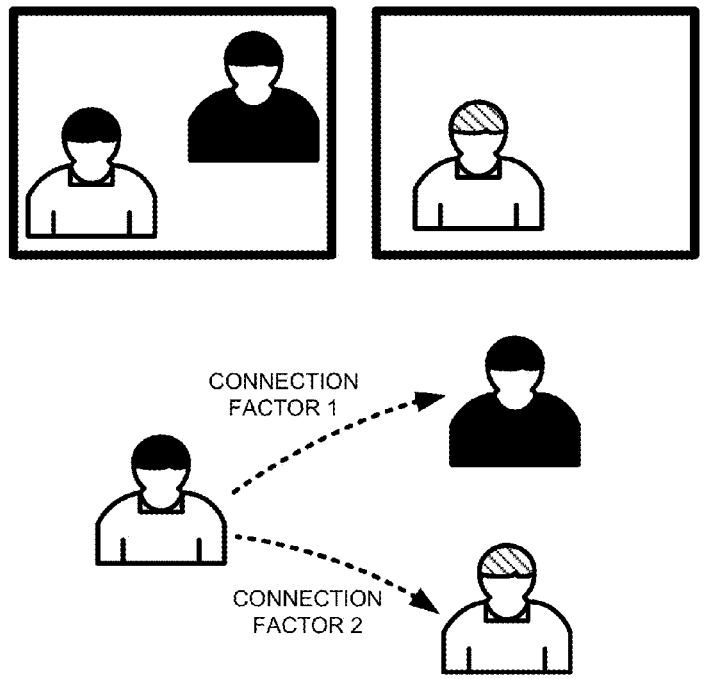
FIGS. 5A-5D illustrate various ways for computing a connector factor using the connection factor generator of FIG. 1.

Reference is now made to FIGS. 5A-5D, which illustrate various ways for computing a connector factor using the connection factor generator 116. With reference to FIG. 5A, in accordance with some embodiments, computing a connection factor for each facial region comprises assigning a lowest value if two facial regions are located in different images. The connection factor may comprise, for example, a scale ranging from zero to an integer number, where a connection factor of zero denotes that the current facial region has no connection with any other facial region, whereas a connection factor comprising the integer number denotes that the facial region exhibits a large degree of connectivity with another facial region. Generally, it can be assumed that two individuals in the same image are more likely to be connected than two individuals in two different images. For example, two individuals in the same image might be friends, family members, etc.

Figure 5B:
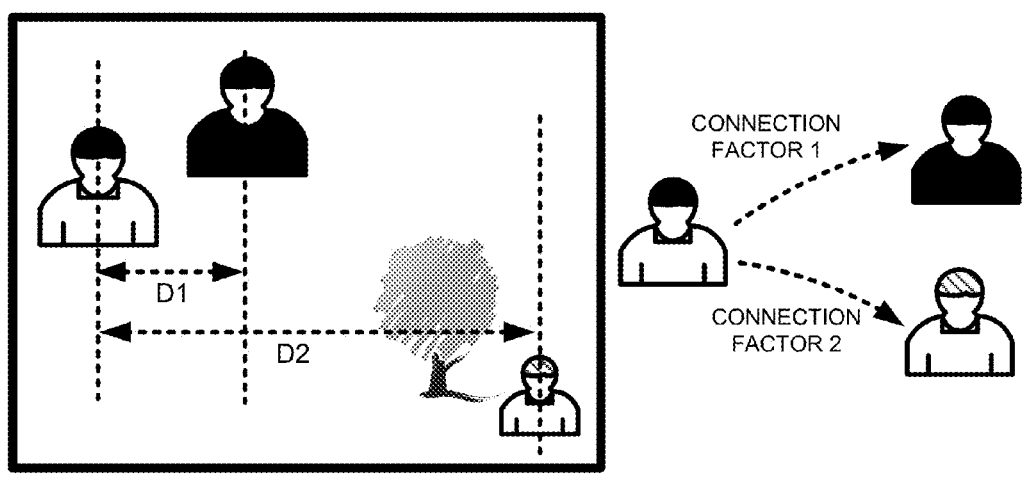

With reference to FIG. 5B, the distance between individuals within the same image or photo may also be evaluated for purposes of assigning a connection factor. In the non-limiting example shown, the two individuals separated by a distance D1 are assigned a higher connection factor than the two individuals separated by a distance D2. Thus, in this illustration, connection factor 1 is greater than connection factor 2. With further reference to 5B, an example is shown where an image comprises a group of individuals in close proximity to each other. The image further comprises an individual standing alone. In accordance with some embodiments, only faces of individuals that are in a group of two or more individuals are kept while any individuals standing alone are discarded.

Figure 5C:
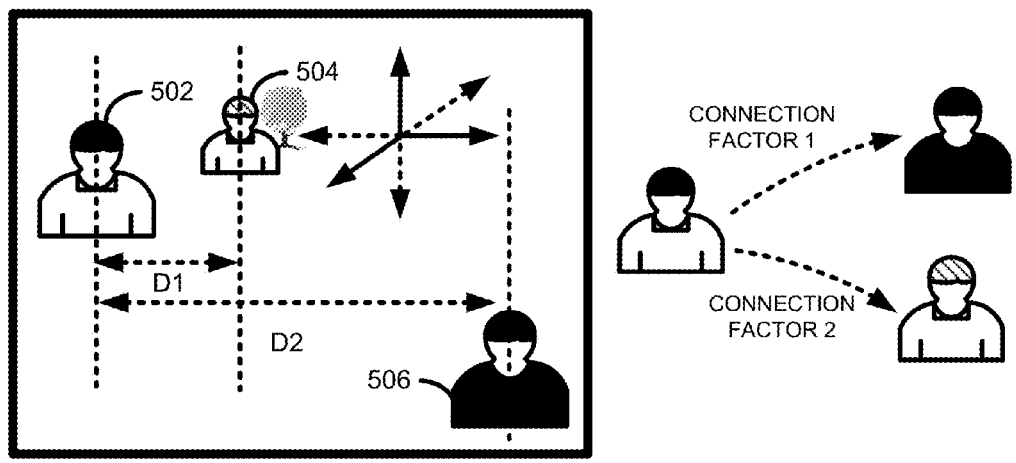

Turning to FIG. 5C, the depth may also be taken into account. In some cases, an individual who is not connected in any way to the other individuals may be inadvertently captured in the background of an image. Accordingly, both the distance and depth may also be taken account. In the non-limiting example shown, the first individual 502 and the second individual 504 are closer together (distance D1) than the first individual 502 and the third individual 506. However, the second individual 504 is farther away in terms of depth, which may indicate that the second individual 504 is an individual in the background. In this regard, both distance and depth information may be taken into account when computing a connection factor to facial regions in the same image or photo. In the non-limiting example shown, connection factor 1 may be assigned a value greater than connection factor 2.

Figure 5D:
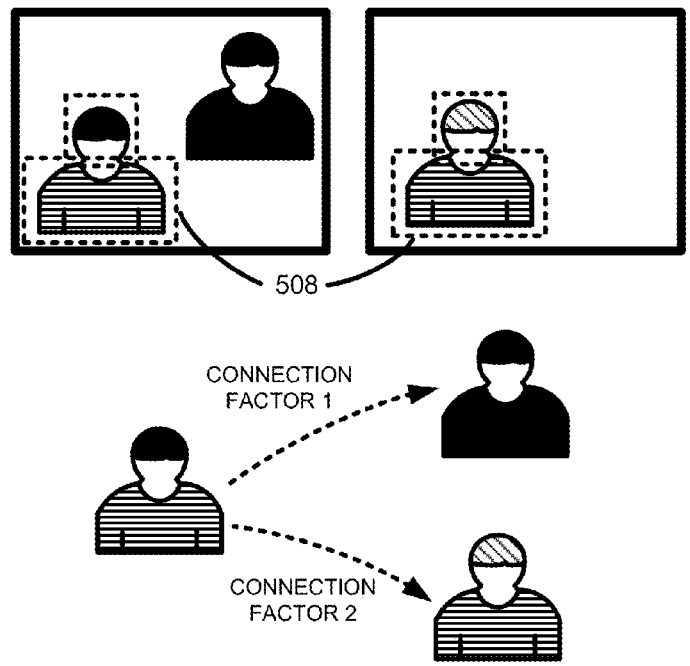

With reference to FIG. 5D, the process of computing a connection factor may also include analyzing the clothing region 508 associated with the identified facial region. Specifically, similarities between clothing features may be identified between a current image and all the remaining images. For example, two individuals in two different images with the same clothing characteristics (e.g., the same shirt) may either be the same individual or two individuals who are connected in some way—for example, teammates on a baseball team or classmates at school. For such cases, the connection factor is higher than for two individuals with different clothing (i.e., connection factor 1 is less than connection factor 2).

Figure 6:
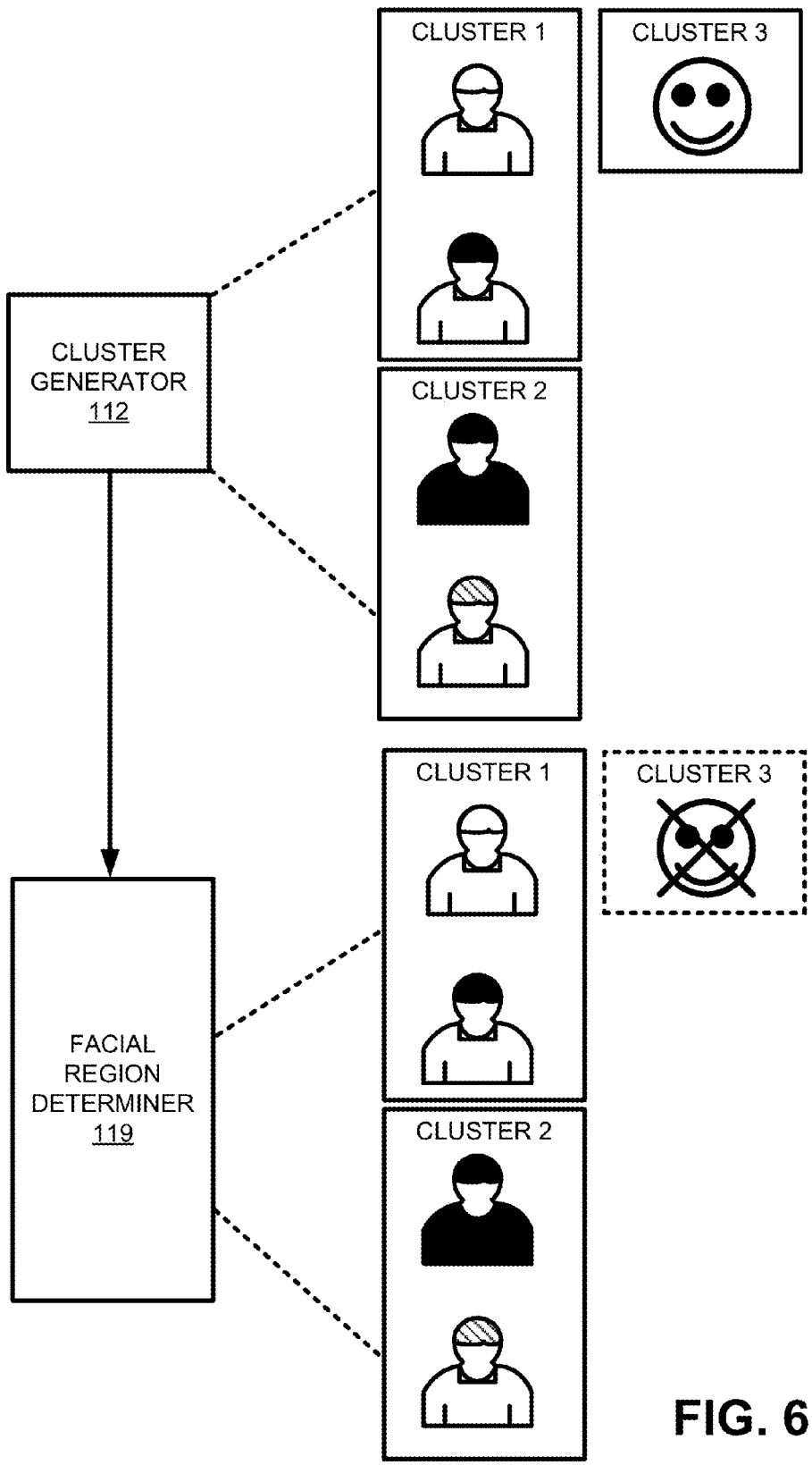
FIG. 6 illustrates an embodiment of detecting facial regions based on clustering using the cluster generator of FIG. 1.

Reference is made to FIG. 6, which illustrates an embodiment of detecting facial regions based on clustering using the cluster generator 112 of FIG. 1. In accordance with some embodiments, the assurance factor generator 114 assigns each of the facial regions an assurance factor according to detected facial regions. The cluster generator 112 forms clusters of facial regions based on a connection factor between the facial regions. Based on the assurance factors and the clusters, the facial region determiner 119 filters images. Various criteria can be applied by the facial region determiner 119. For some embodiments, facial regions that are not clustered with any other facial regions are discarded. In other embodiments, clusters that do not meet a predetermined size threshold (e.g., at least three faces in a cluster) are discarded by the facial region determiner 119.

Figure 7:
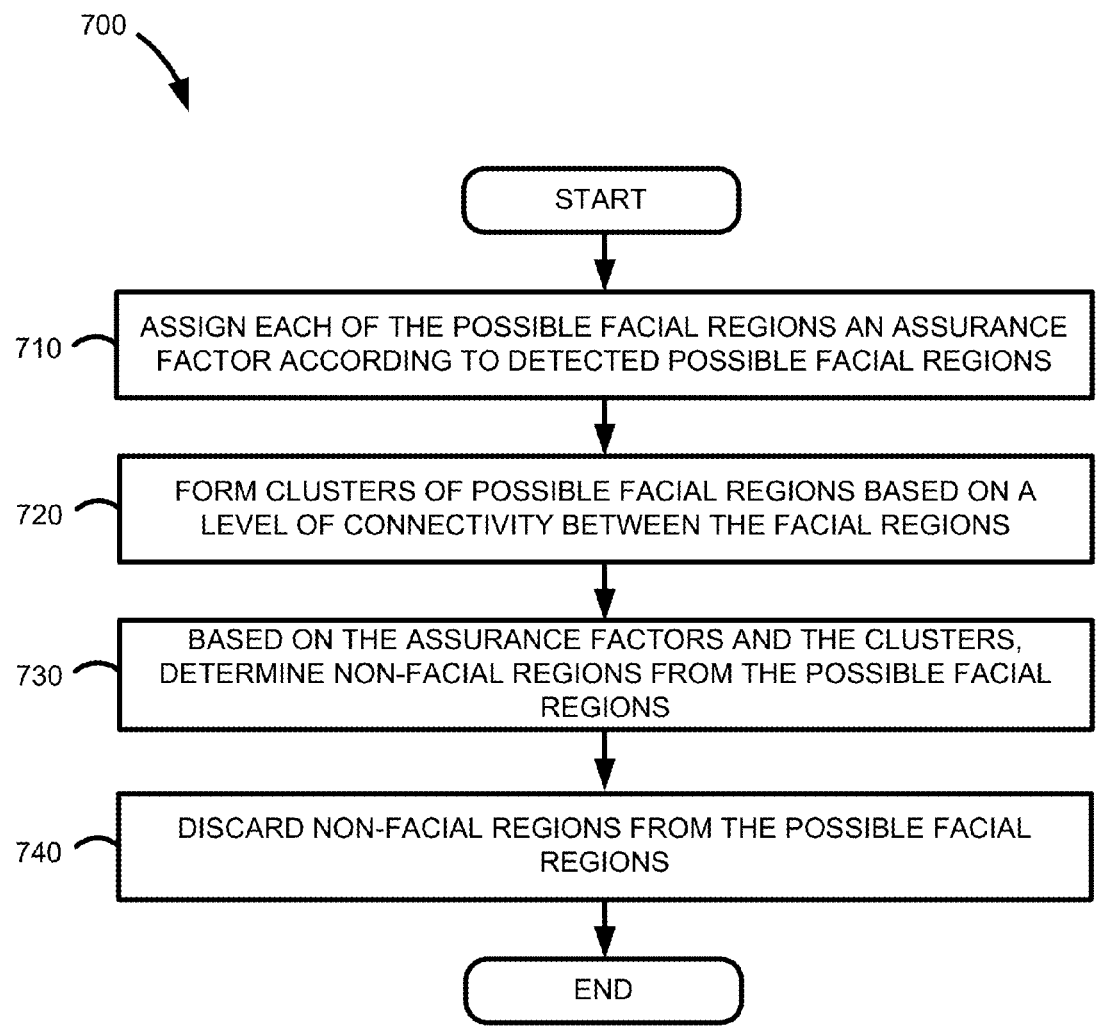
FIG. 7 is a flowchart for an alternative method of performing facial detection utilizing the image processing system of FIGS. 1 and 2.

Reference is now made to FIG. 7, which is a flowchart 700 for an alternative method of performing facial detection utilizing the image processing system 102 of FIGS. 1 and 2. If embodied in software, each block depicted in FIG. 7 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor in a computer system or other system such as the one shown in FIG. 1. The machine code may be converted from the source code, etc. If embodied in hardware, each block may represent a circuit or a number of interconnected circuits to implement the specified logical function(s).

Although the flowchart 700 of FIG. 7 shows a specific order of execution, it is understood that the order of execution may differ from that which is depicted. In block 710, each of the possible facial regions is assigned an assurance factor according to detected possible facial regions. In block 720, clusters of possible facial regions are formed based on a connection factor between the facial regions. Based on the assurance factors and the clusters, non-facial regions are determined from the possible facial regions (block 730). In block 740, non-facial regions are discarded from the possible facial regions.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A computer-implemented method for detecting facial regions in a plurality of images, the method comprising:

detecting possible facial regions in the plurality of images;

assigning at least one of the possible facial regions an assurance factor;

computing at least one connection factor between at least one possible facial region and at least one of the remaining possible facial regions in the plurality of images; and determining facial regions from the possible facial regions based on the assurance factors and connection factors.

2. The method of claim 1, wherein the computing step is performed if the assurance factor of one of the possible facial regions is less than a first predetermined threshold.

3. The method of claim 1, wherein determining facial regions from the possible facial regions based on the assurance factors and connection factors further comprises determining facial regions based on the connection factors and a second predetermined threshold.

4. The method of claim 1, wherein determining facial regions from the possible facial regions based on the assurance factors and connection factors comprises:

clustering possible facial regions based on the connection factors; and determining a facial region exists if the possible facial region is clustered with other possible facial regions.

5. The method of claim 1, wherein determining facial regions from the possible facial regions based on the assurance factors and connection factors comprises determining facial regions based on one of:

an assurance factor of a possible facial region being larger than a first predetermined threshold; and one of the connection factors between the possible facial region and the one of the other possible facial regions being larger than a second predetermined threshold.

6. The method of claim 1, wherein computing comprises:

determining similarity in facial characteristics between a current possible facial region and one of the remaining possible facial regions; and assigning a connection factor quantifying a degree of similarity.

7. The method of claim 1, wherein computing comprises:

detecting a clothing region of each possible facial region;

identifying similarity of clothing features between a current possible facial region and one of the remaining possible facial regions; and assigning a connection factor quantifying a degree of similarity in the clothing features.

8. The method of claim 1, wherein computing at least one connection factor comprises assigning a lowest relative value if two possible facial regions are located in different images.

9. The method of claim 1, wherein computing at least one connection factor comprises assigning a value that is inversely proportional to a distance between two possible facial regions if the two possible facial regions are within the same image.

10. An image processing system, comprising:

an assurance factor generator configured to detect possible facial regions in a plurality of images and assign at least one of the possible facial regions an assurance factor based on facial characteristics in the detected possible facial regions;

a connection factor generator configured to assign, for at least one of the possible facial regions, a value reflecting a connection factor between a current possible facial region and all remaining possible facial regions; and a facial region determiner configured to determine one or more facial regions based on the assurance factor and connection factor.

11. The system of claim 10, wherein the assurance factor generator assigns the assurance factor based on a presence of a predetermined number of facial characteristics.

12. The system of claim 10, wherein the assurance factor generator assigns the assurance factor by first scanning a target image.

13. The system of claim 10, wherein the connection factor generator assigns the value reflecting the connection factor by determining similarities in facial characteristics between a current possible facial region and at least one of the remaining possible facial regions, and quantifying a degree of similarities in facial characteristics.

14. The system of claim 10, wherein the connection factor generator assigns the value reflecting the connection factor based on one or more of: possible facial regions and clothing regions associated with the possible facial regions.

15. The system of claim 10, wherein the connection factor generator assigns the value reflecting the connection factor where possible facial regions within a same image have a higher relative connection factor than connection factors associated with possible facial regions in different images.

16. The system of claim 15, wherein the connection factor generator assigns the value reflecting the connection factor where possible facial regions within a same image that are closer together have a higher relative connection factor than connection factors associated with possible facial regions in the same image that are farther apart.

17. A computer-implemented method for detecting facial regions among possible facial regions in a plurality of images, the method comprising:

assigning at least one of the possible facial regions an assurance factor;

forming clusters of possible facial regions based on a connection factor between the facial regions, wherein the connection factor is a value reflecting a connection factor between a current image and remaining images; and determining facial regions from the possible facial regions based on the assurance factor and the clusters of possible facial regions.

18. The method of claim 17, wherein determining facial regions from the possible facial regions is performed according to at least one of:

the possible facial regions being clustered with other possible facial regions; and the possible facial regions having an assurance factor larger than a predetermined threshold.

19. The method of claim 17, further comprising:

identifying a cluster of possible facial regions with a size less than a predetermined number of facial regions; and discarding the possible facial regions within the identified cluster.

20. The method of claim 17, further comprising:

identifying similarity in one of facial characteristics and clothing features between a current possible facial region and one of the remaining possible facial regions; and assigning a connection factor quantifying a degree of similarity.

21. The method of claim 17, further comprising:

detecting a clothing region for each possible facial region;

identifying similarity in clothing features between a current possible facial region and one of the remaining possible facial regions; and assigning the connection factor quantifying a degree of similarity in clothing features.

* * * * *